United States Patent Office.

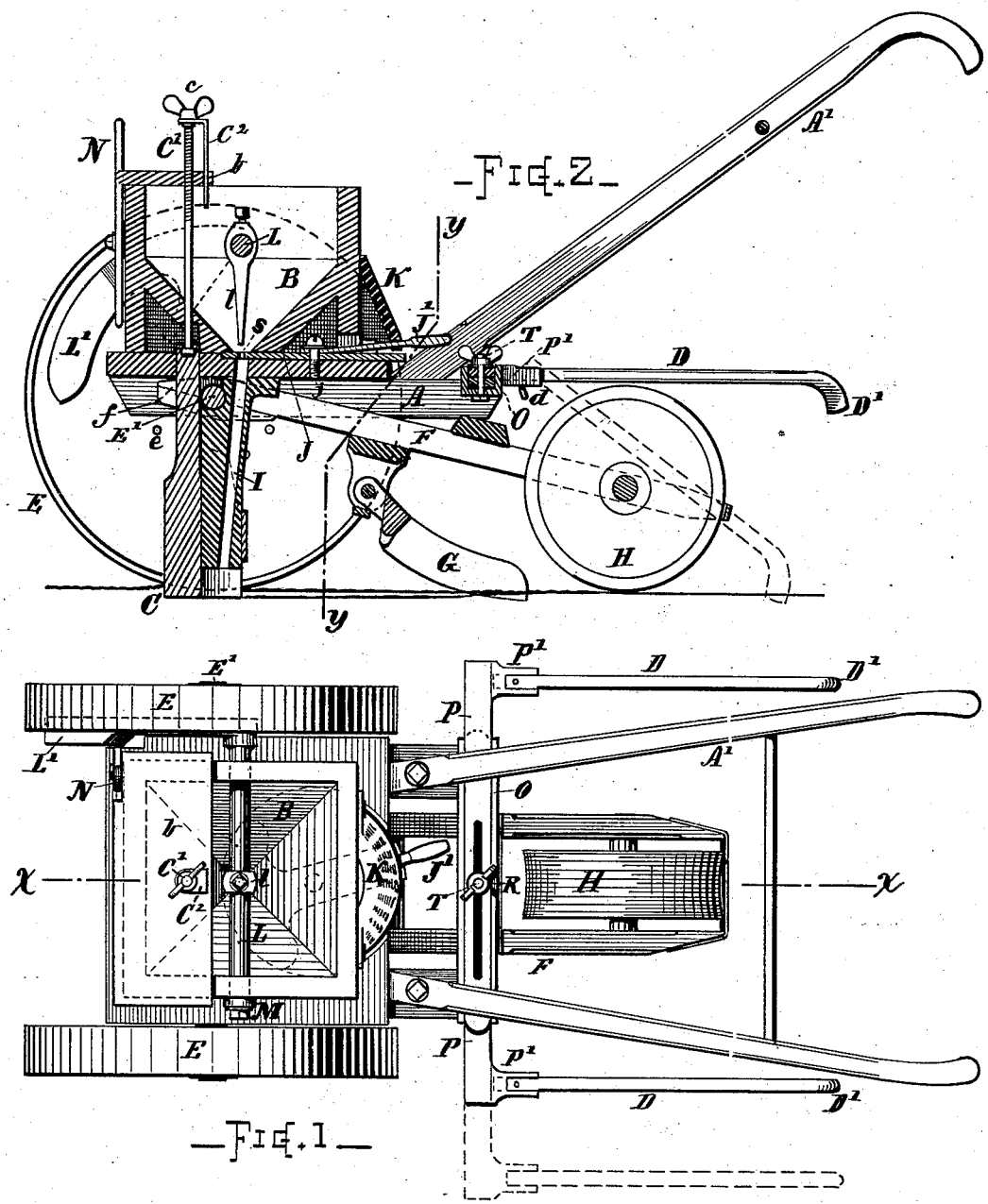

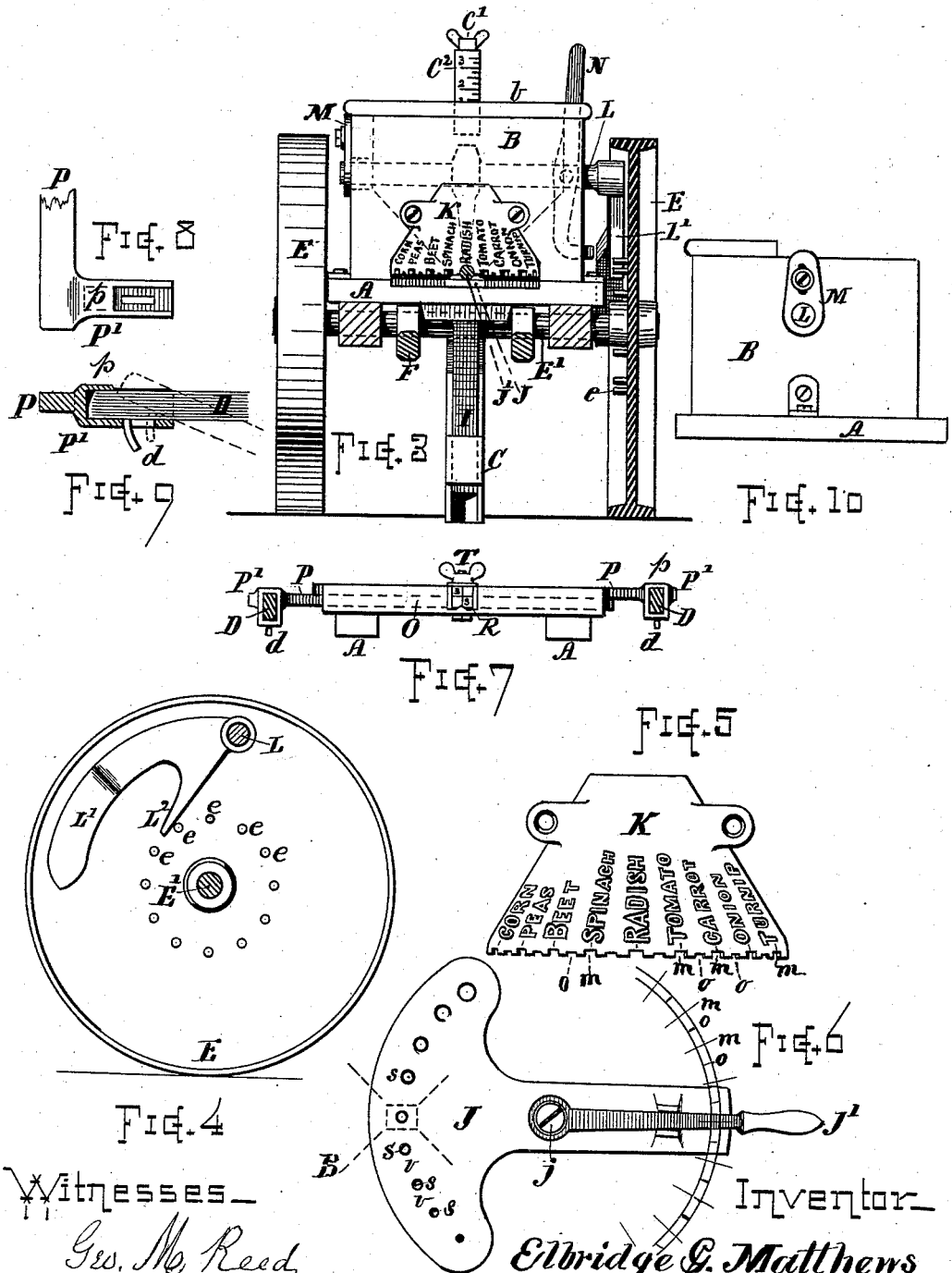

ELBRIDGE G. MATTHEWS, OF WORCESTER, MASSACHUSETTS, ASSIGNOR TO HENRY B. HAKES, OF SAME PLACE.

SEEDING-DRILL.

SPECIFICATION forming part of Letters Patent No. 231,920, dated September 7, 1880.

Application filed June 10, 1880. (No model.)

*To all whom it may concern:*

Be it known that I, ELBRIDGE G. MATTHEWS, of Worcester, in the county of Worcester and State of Massachusetts, have invented certain new and useful Improvements in Seeding-Drills; and I declare the following to be a description of my said invention sufficiently full, clear, and exact to enable others skilled in the art to which it appertains to make and use the same, reference being had to the accompanying drawings, which form a part of this specification.

My invention relates to that class of seeding-machines which are employed for planting different varieties of small seeds in drills or rows; and the objects of my improvements are to produce a mechanism compact and convenient to handle and operate; to render the several parts and devices more perfect in construction and practical adaptation to their respective purposes; to provide ready and convenient facilities for the proper and accurate adjustment of the plow, markers, and seed-delivering devices to meet the various requirements for different kinds of seeds, soils, &c.; and to make the machine more reliable, effective, and economical in its operation and use. I attain these objects by the mechanism illustrated in the accompanying drawings, and herein described, the particular features of improvement claimed being hereinafter definitely specified.

In the drawings, Figure 1 represents a plan view of my improved seeding-drill. Fig. 2 represents a central vertical sectional view of the same at line $x$ $x$, Fig. 1. Fig. 3 represents a transverse sectional view at line $y$ $y$, Fig. 2, the side of one wheel being also shown removed to reveal parts beneath. Fig. 4 is a sectional view, showing the wheel and agitator operating devices. Fig. 5 is a view of the adjustment-indicator for seed-delivering devices, drawn to a larger scale. Fig. 6 is a plan view, on a similar scale, of the seed-delivery plate, with diagram lines showing positions of adjustment and relative location of hopper-bottom. Fig. 7 is a rear view of the marker-supports. Fig. 8 is a plan view, showing the end of one of the marker-support bars. Fig. 9 is a sectional view of the same, showing the positions of the marker when raised and when lowered for use. Fig. 10 is a side view of the seed-box and device for adjusting the agitator-shaft.

The part marked A is the main frame for supporting the seed-box B, plow C, and marker devices D D. Said frame is provided with suitable handles A', and is mounted on the shaft E', between the wheels E, as indicated, the shaft in the present instance being arranged to revolve with the wheels.

F indicates the follower or coverer-frame, carrying the covering-blades G and presser-roller H, for covering the seed in the ordinary manner as it falls through the conductor I into the drill or furrow opened by the plow C.

The forward end of the frame F is connected to the shaft E' at either side of the seed-conductor by passing said shaft through bearings or openings in the bars of said frame, thus permitting the swing of said frame while giving simplicity of construction. The forward extremities $f$ of said frame F are carried a short distance beyond the shaft E', and their upper surfaces properly beveled or shaped to rest against the under side of the main frame A when the handles A' are raised, and thus prevent the rear end of said frame F from swinging down beyond a given position. Hence the operator can readily raise the roller H from the ground by the handles A'.

The plow C is made to slide up and down on the seed-conductor I, the latter serving as the guide and standard therefor. A screw-threaded rod, C', is attached by swivel-connection to the top of the plow, and extends up through the seed-box B, as shown. Said rod is provided with a thumb-head, $c$, and its screw-thread is held by a nut or female thread in the top piece, $b$, of box B, so that by turning the rod C' the plow C can be raised or lowered.

An index-plate, $C^2$, with a proper scale marked thereon, is connected to the top of the rod, and passes down through the board $b$, to indicate the depth to which the plow works or to which the seed is planted, the surface of the board $b$, in connection with said index-scale on plate $C^2$, showing the relative adjustment of the plow, and this at a position where it is at all times under the eye of the operator.

J indicates the delivery-plate, provided with the series of various-sized holes s for the passage of different kinds of seeds, and arranged between the hopper B and conductor I. Said plate J is made of the form shown in Fig. 6, fulcrumed on a suitable pivot-stud, j, and provided with a spring-handle, J', which projects at the rear of the seed-box, and by means of which the plate J can be moved or swung on its pivot j for adjustment.

K denotes an adjustment indicator and catch for the seed-plate J, and consisting of a conically-faced casting or plate secured to the seed-box B in the position shown, and having along its lower edge a series of recesses, m, to receive the handle-bar J' at positions corresponding with the locations of the seed-holes s, while above said recesses m, and prominently borne upon the face of said piece K, are the names of the kinds of seed which the respective holes s are adapted to deliver, so that for adjusting the plate J to proper working position the operator has simply to depress the handle J' and swing the plate to a position where the handle will spring up into that recess m bearing the name of the seed to be planted. By the use of the piece K, with names and catch-recesses, as described, the adjustment can be conveniently effected by the operator, and the necessity of printed instructions as to the proper method of adjusting the plate is obviated.

A series of notches, o, may be formed on the piece K, intermediate with recesses m, and to correspond with the solid portions v of plate J between the holes s, so that when the handle J' is placed in either of the notches o the plate J will completely close the bottom of the seed-hopper, thus preventing the waste of seed.

L indicates the agitator-shaft arranged through the seed-box B, and bearing the finger l for stirring the seed in the lower part of the hopper. Said shaft is journaled in an adjustable plate, M, at one end, while its opposite end extends beyond the side of the box B nearly to the wheel E, and is provided with a curved weighted arm, L', having a pawl-finger, L², which engages with pins e on the wheel E, and by means of which the agitator is vibrated. The shaft L, arm L', and pawl L² are made integral.

The arm L' is raised by the pins e passing under the pawl L², and then drops back by the weight of its forward enlarged end.

A hooked lever, N, is arranged at the front of the seed-box, which swings under the arm L', and retains it at an elevated position when desired to move the machine without operating, as when going to or from the work.

The plate M is vertically slotted, so that by loosening the bolt or screw which attaches it to the box B the end of shaft L can be raised or lowered for adjusting the end of finger l in proper relation to the delivery-opening s.

At the rear part of the frame A is a chambered transom or guide, O, which supports adjustable bars P P, to the ends of which are connected the markers D. The bars P are slotted longitudinally, and are retained at adjusted positions by a single set-screw or bolt, T, passing through said slots and retained in the piece O. At the ends of the bars P are formed sockets P', (see Figs. 7, 8, and 9,) with slotted bottoms, vertical sides, and short top ledges, p, to receive and support the ends of the markers, as indicated.

The markers D consist of straight bars having heavy curved ends or drag-blades D' at their rear extremities, while their forward ends are made to fit the sockets P', and are furnished with a pin or hooks, d, which pass through the slot in the bottoms of said sockets, as shown. When the end of the marker D is placed beneath the top ledge, p, said marker D will be held with its rear end, D', raised from the ground, as shown by full lines, Figs. 2 and 9; but when withdrawn from said ledge p its rear end, D', will drag upon the ground for marking the position for the next drill or row to be planted, said marker being retained to the machine by the pin d, as indicated by dotted lines.

The markers D can be readily detached by raising them from the sockets P'.

This arrangement of the parts permits of either right or left marker being used at will.

The width at which the drills are marked off, or the spacing of the rows, is regulated by adjustment of the bars P outward or inward. (See dotted lines, Fig. 1.)

The bars P are provided with an index-scale marked on their rear edges, to facilitate the accurate lateral adjustment of the markers. Said scale can be viewed through the central opening, R, formed in the side of the guideway O.

By constructing the plow C and its adjusting mechanism in the peculiar manner shown no attaching-bolts or fastenings are required other than the rod C' for retaining said plow in position, the plow being made simply to embrace the conductor, so as to slide freely thereon. Hence the adjustment can be effected with the plow in its furrow and without turning the machine on its side.

The operation of the improved devices will be sufficiently understood from the foregoing description. The general manner of using the machine when planting is substantially similar to that of ordinary machines of this class.

I do not herein claim, broadly, an adjustable plow supported on the seed-conductor, as I am aware that such have heretofore been used. Neither do I broadly claim the use of a seed-delivery plate with various passages adjustable to the bottom passage of the hopper or seed-box.

What I claim as of my invention, and desire to secure by Letters Patent, is—

1. In a seeding-machine, the combination, with the seed-box B, mounted upon the wheeled frame carrying the dependent seed-conductor I, of the plow C, retained to and vertically adjustable on said conductor, and the rod C', connected by swivel to said plow and screw-threaded to the top piece, b, substantially as and for the purpose set forth.

2. In a seeding-machine, the combination, with the vertically-adjustable plow C, the adjusting-rod C', and nut-bearing top piece, b, of the scale or index-plate C², connected to said adjusting-rod and extending downward through said top plate, as and for the purpose set forth.

3. In a seeding-machine, the combination, with the adjustable seed-delivering devices, of the conoidal casting or indicator-plate K, having catch-recesses m and permanently attached to the seed-box, and provided with or bearing prominently inscribed on its face the names of the various kinds of seeds which the devices are adapted to deliver when adjusted to the corresponding recesses, as set forth.

4. The combination, substantially as hereinbefore described, of the seed-box B, the conductor I, the delivery-plate J, having the series of seed-passages s and provided with spring handle-bar J', and the adjustment indicator plate or casting K, with catch-recesses m, severally designated by the names of the kind of seeds which the machine is adapted to deliver at the respective positions of adjustment, said names being borne or inscribed on the face of said plate, as set forth.

5. The combination, with the seed box or hopper B, of the delivery-plate J, made in the form shown, with the series of seed-passages s and intervening solid portions V, and the spring-handle J', and the indicator-plate K, provided with principal recesses m, with designating-names arranged correlative to the seed-passages, and intermediate recesses, o, arranged correlative to said solid spaces, substantially as and for the purposes set forth.

6. The combination, substantially as hereinbefore described, of the seed-box, the agitator-shaft L, provided with the weighted curved arm L' and pawl L², and carrying the stirring-finger l, and the wheel E, provided with lugs or pins e, as and for the purposes set forth.

7. The combination, substantially as hereinbefore described, of the channeled transom or guideway O, mounted on the frame A, the bar or bars P, provided with socket-heads P' and adjustably retained within said guideway, and the marker bar or bars D D', detachably and adjustably retained to said sockets, for operation in the manner set forth.

8. The combination, substantially as hereinbefore described, of the channeled guideway O, mounted on the frame A and provided with an open space or side recess, R, the slotted bars P, having an index-scale on their edges and supporting the markers D D² at their outer ends, and the clamping screw or bolt T, as and for the purposes set forth.

9. The combination, substantially as hereinbefore described, of the main frame A, carrying the seed-box, seed-conductor, and plow, the shaft E', or axle connecting the wheels E, and the coverer-frame F, connected directly to said axle or shaft, and provided with projecting ends f, to rest against the under side of the main frame and limit the swing of said coverer-frame, as and for the purpose set forth.

Witness my hand this 27th day of May, A. D. 1880.

ELBRIDGE G. MATTHEWS.

Witnesses:
   CHAS. H. BURLEIGH,
   S. R. BARTON.